Dec. 13, 1927.

F. G. GIES

WASHING MACHINE

Original Filed Nov. 20, 1926   2 Sheets-Sheet 2

1,652,273

Inventor
Frank G. Gies
By Jking Harness
Attorney

Patented Dec. 13, 1927.

1,652,273

UNITED STATES PATENT OFFICE.

FRANK G. GIES, OF DETROIT, MICHIGAN, ASSIGNOR TO OUR SALES AND SERVICE COMPANY, OF DETROIT, MICHIGAN, A CORPORATION OF MICHIGAN.

WASHING MACHINE.

Original application filed November 20, 1926, Serial No. 149,603. Divided and this application filed April 20, 1927. Serial No. 185,130.

One of the primary objects of my invention is to provide a simple, economical and efficient arrangement of change speed gearing for operating the machine at different speeds.

Other and further objects of my invention will be apparent as the specification progresses, and it may be stated that my invention consists in the arrangement, combination and construction of the various parts of my improved device as described in the specification, claimed in my claims and shown in the accompanying drawings, in which:

Figure 1:
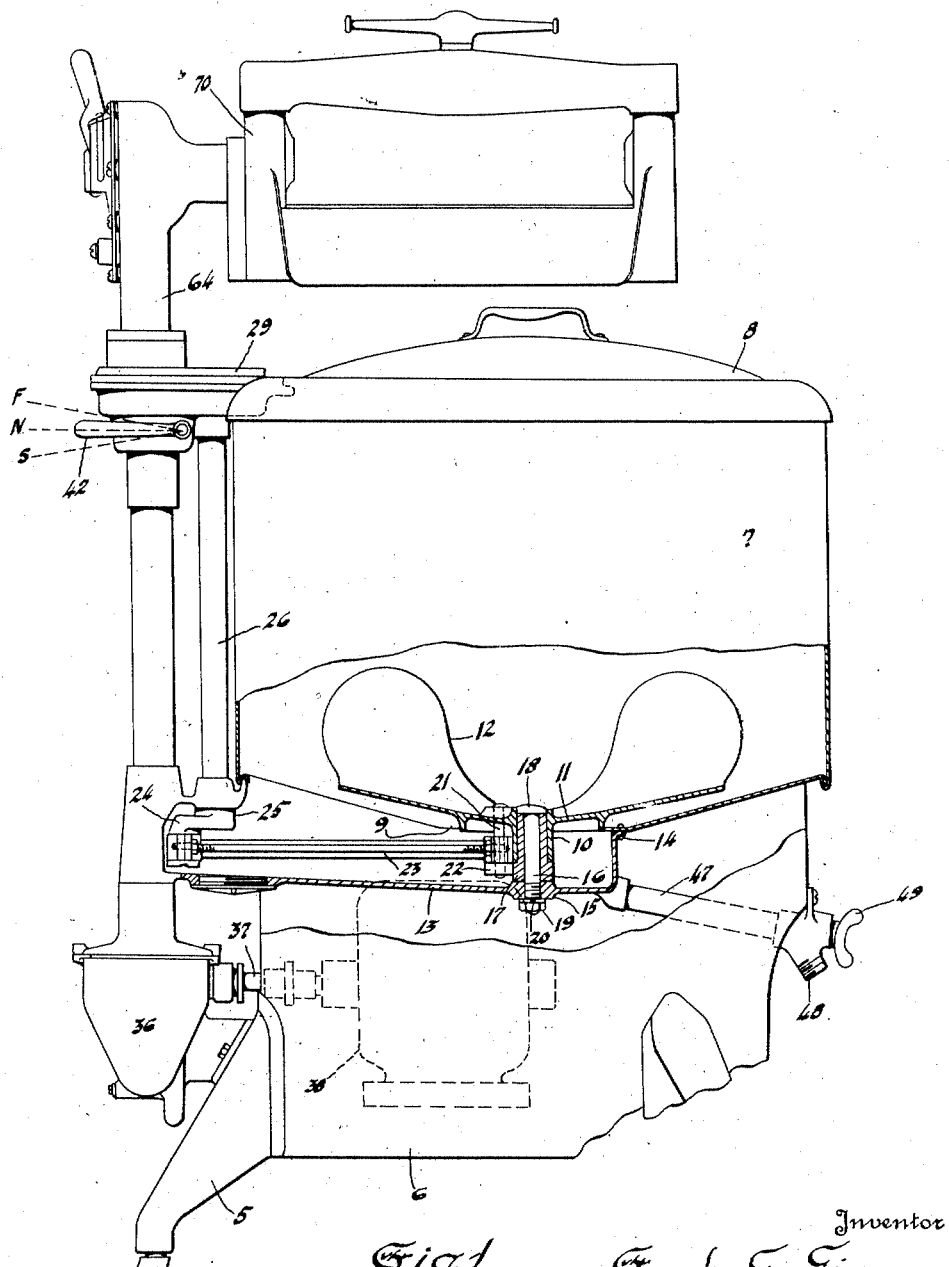
Fig. 1 is a front elevation of my improved machine, parts being broken away to illustrate the agitator drive contained therein.
Figure 2:
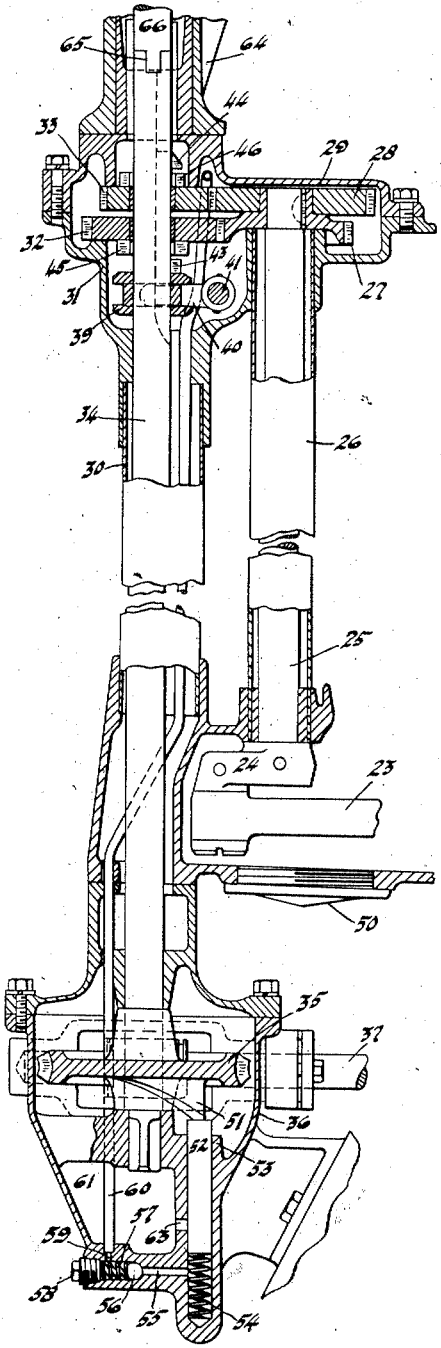
Fig. 2 is a central sectinal view of the driving connections, lubricating system and change speed gearing utilized in my invention.

I have shown a washing machine comprising a plurality of legs 5 supporting a base 6 on which is mounted a stationary tub 7 having a removable top 8. The bottom of the tub 7 is provided with a central opening or aperture 9 thru which the hub 10 of an agitator extends. The agitator is composed of a base portion 11 and wing portions 12. A housing 13 is secured to the bottom of the tub 7 as at 14. A boss 15 is provided in the bottom of the housing 13 and a bolt 16 is extended from the agitator base 11 thru the hub 10 and boss 15 to a point outside the housing 13. A suitable bushing or bearing 17 is provided in the hub 10 and around the bolt 16. The head 18 of the bolt 16 bears against the upper end of the bushing 17 and a nut 19 is provided on the lower end of the bolt, and is adapted to be screwed thereon for rigidly securing the bolt in place. A lock washer 20 is provided between the nut 19 and the boss 15. There is little or no possibility of water leaking thru the aperture in the boss 15 but if it is desired, a sealing gasket may be placed either between the washer 20 and boss 15 or between the boss 15 and bearing 17. Also, the bearing 17 may be made of self-lubricating material such as is commonly used in providing oilless bearings.

Depending from the base 11 of the agitator is a pin 21 which is adapted to connect with a crank 22. The crank 22 is connected by a connecting rod 23 to a crank 24 on the end of a shaft 25 in the housing 26. The shaft 25 is keyed at its upper end to the gears 27 and 28 within the housing 29.

Extending in parallel relation to the shaft housing 26 is the shaft housing 30 which has on its upper end a housing 31 within which are positioned gears 32 and 33 meshing with the gears 27 and 28 respectively. The gears 32 and 33 are freely rotatable on the shaft 34 within the housing 30. The lower end of the shaft 34 is provided with a worm gear 35, mounted in the enlarged bottom housing 36 and connected by a worm with the motor shaft 37 on the electric motor 38.

Longitudinally slidable on the shaft 34 is a shifting collar 39 which is engaged by the arm 40 connected thru the rod 41 with a shifting arm 42. The shifting collar 39 has connected therewith and keyed to the shaft 34, clutch members 43 and 44 adapted to alternately engage with the clutch members 45 and 46 respectively. The clutch members 45 and 46 are respectively integral with the gears 32 and 33 so that when the clutch member 43 is engaged with the clutch member 45, the gear 32 will be driven and rotation of the gear 32 will cause rotation of the gear 27 and shaft 25 at what may be termed "high speed". On the other hand, when the clutch member 44 is engaged with the clutch member 46, the other two clutch members will be disengaged and the gear 33 will be driven, causing rotation of the gear 28 and shaft 25 at what may be termed "low speed". In Fig. 1 I have designated with the letters F, N and S the respective positions of the shifting lever 42 for fast, neutral and slow speeds. It will be understood, of course, that the rotation of the shaft 25 will cause rotation of the crank 24 and reciprocation of the connecting rod 23, thereby oscillating the agitator 11.

The water which is contained in the tank 7 has access to the housing 13, and in fact, the tub and housing may be drained by means of a pipe 47 connected with the housing 13 and having an outlet end 48 and a valve 49. A cap 50 is also screwed into the housing 13 adjacent the outside end thereof for the purpose of providing access to the parts therein.

It will be understood that the driving connection for the agitator is entirely encased within the housing 13 so that no moving parts are extended thru the bottom of the housing 13 and a complete and absolute seal may be made around the stationary bolt 16 where it emerges from the housing 13. The water in the tub 7 will not only fill the housing 13 but may enter the housing 26 to the same level as is present in the tub 7. There is no opportunity, however, for the water to leak from the housing 26, and it will be naturally drained therefrom when the tub is drained.

The shaft 34 is provided, beneath the worm gear 35, with a cam 51 which is adapted to engage with a pin 52 slidable in the apertured boss 53 in the casing 36. A coil spring 54 is positioned beneath the pin 52 and a passage 55 communicates with the chamber housing the spring 54. A ball valve 56 is provided in the passage 55, the ball being normally held in seated position by a coil spring 57 held in place by an adjustable plug 58 screwed into the housing 36. A passage 59 communicates with the passage 55 and is connected to a pipe 60 which leads up thru the housing 30 to a point directly above the gears 32 and 33. An oil pocket or chamber 61 is provided in the bottom of the housing 36 and when the shaft 34 is rotated so that the shallow portion of the cam 51 contacts with the pin or plunger 52, the coil spring 54 will raise the plunger so as to uncover the passage 63, leading from the oil chamber, with the passage in the boss 53. Oil from the chamber 61 may thus pass thru the passage 63 and continued rotation of the shaft 34 to bring the high part of the cam 51 in contact with the plunger 52 will again force the plunger 52 downwardly and thereby force the oil which has gathered in the apertured boss 53 thru the passage 55, past the ball check 56 and out thru the passage 59 and pipe 60 to the gears 32 and 33. Thus, the gears 32 and 33 will be thoroughly lubricated and excess oil will drip back along the housing 30 to the worm gear 35 and thence into the reservoir 61.

A housing 64 is provided above the housing 29 into which the upper end of the shaft 34 extends. The shaft 34 is clutched as at 65 to a shaft 66, which shaft upon rotation operates the wringer mechanism generally indicated at 70 and which need not be herein specifically described.

It will be apparent from the foregoing that the objects of the invention are simply and efficiently accomplished and that various changes may be made in the arrangement, combination and construction of the various parts of my improved device without departing from the spirit of my invention and it is my intention to cover by my claim such changes as may be reasonably included within the scope thereof.

It will further be apparent that the invention herein claimed is a division of my co-pending application Serial No. 149,603 filed November 20, 1926.

What I claim is:

A washing machine drive comprising a drive shaft and driven shaft positioned parallel to each other, a pair of different sized gears fixed on one shaft and a pair of different sized gears freely rotatable on the other shaft, a clutch member fixed for rotation with the latter shaft but slidable thereon, and having clutch teeth positioned above one of the latter gears and under the other, clutch teeth on said gears in juxtaposition to the clutch teeth on the clutch member, and means for sliding the clutch member on said shaft to alternately engage the two sets of its clutch teeth with the two sets of clutch teeth on the gears.

FRANK G. GIES.